(12) United States Patent
Olver (10) Patent No.: US 7,854,120 B2
(45) Date of Patent: Dec. 21, 2010

(54) FUEL MANIFOLD WITH REDUCED LOSSES

(75) Inventor: Bryan William Olver, Nobleton (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 1328 days.

(21) Appl. No.: 11/366,815

(22) Filed: Mar. 3, 2006

(65) Prior Publication Data

US 2010/0229555 A1    Sep. 16, 2010

(51) Int. Cl.
*F02C 1/00*    (2006.01)
*F02G 3/00*    (2006.01)
(52) U.S. Cl. ................. 60/739; 60/740; 60/734
(58) Field of Classification Search ............. 60/776, 60/734, 740, 739, 741, 742, 746, 747, 748
See application file for complete search history.

(56) References Cited

U.S. PATENT DOCUMENTS

| | | | |
|---|---|---|---|
| 2,151,540 A | 3/1939 | Varga | |
| 2,946,185 A | 7/1960 | Bayer | |
| 2,959,003 A * | 11/1960 | Carlisle et al. | ............... 60/742 |
| 3,213,523 A | 10/1965 | Boehler | |
| 3,472,025 A | 10/1969 | Simmons et al. | |
| 3,662,959 A * | 5/1972 | Sample, Jr. | ............... 239/533.2 |
| 3,684,186 A * | 8/1972 | Helmrich | ............... 239/400 |
| 3,685,741 A * | 8/1972 | O'Sickey | ............... 239/406 |
| 3,691,765 A * | 9/1972 | Carlisle | ............... 60/742 |
| 3,879,940 A * | 4/1975 | Stenger et al. | ............... 60/737 |
| 4,070,826 A * | 1/1978 | Stenger et al. | ............... 60/748 |
| 4,100,733 A | 7/1978 | Streibel et al. | |
| 4,229,944 A * | 10/1980 | Weiler | ............... 60/740 |
| 4,258,544 A * | 3/1981 | Gebhart et al. | ............... 60/800 |
| 4,305,255 A * | 12/1981 | Davies et al. | ............... 60/741 |
| 4,322,945 A | 4/1982 | Peterson et al. | |
| 4,404,806 A | 9/1983 | Bell, III et al. | |
| 4,735,044 A * | 4/1988 | Richey et al. | ............... 60/742 |
| 5,036,657 A | 8/1991 | Seto et al. | |
| 5,097,666 A * | 3/1992 | Shekleton et al. | ............... 60/737 |
| 5,174,504 A * | 12/1992 | Halvorsen | ............... 239/410 |
| 5,253,471 A | 10/1993 | Richardson | |
| 5,271,219 A | 12/1993 | Richardson | |
| 5,396,759 A | 3/1995 | Richardson | |
| 5,400,968 A | 3/1995 | Sood | |
| 5,419,115 A | 5/1995 | Butler et al. | |
| 5,423,178 A | 6/1995 | Mains | |
| 5,570,580 A | 11/1996 | Mains | |
| 5,579,645 A | 12/1996 | Prociw et al. | |
| 5,598,696 A | 2/1997 | Stotts | |
| 5,657,632 A * | 8/1997 | Foss | ............... 60/742 |
| 5,771,696 A | 6/1998 | Hansel et al. | |
| 5,848,525 A | 12/1998 | Spencer | |

(Continued)

FOREIGN PATENT DOCUMENTS

CA    1013153    7/1977

(Continued)

*Primary Examiner*—William H Rodríguez
(74) *Attorney, Agent, or Firm*—Ogilvy Renault LLP (57) ABSTRACT

A fuel conveying member of a gas turbine engine fuel system conducting pressurized fluid flow is provided. The fuel conveying member comprises a body defining an L-shaped fuel flow passage therein, the L-shaped passage including an elbow. The elbow portion provides a substantially smooth fluid-dynamic transition between portions of the passage upstream and downstream thereof.

20 Claims, 5 Drawing Sheets

U.S. PATENT DOCUMENTS

| | | | |
|---|---|---|---|
| 5,918,628 A * | 7/1999 | Harding | 137/512.1 |
| 5,956,955 A | 9/1999 | Schmid | |
| 5,970,716 A * | 10/1999 | Forrester et al. | 60/746 |
| 5,983,642 A | 11/1999 | Parker et al. | |
| 5,988,531 A * | 11/1999 | Maden et al. | 239/406 |
| 5,996,335 A | 12/1999 | Ebel | |
| 6,109,038 A | 8/2000 | Sharifi et al. | |
| 6,141,968 A * | 11/2000 | Gates et al. | 60/740 |
| 6,149,075 A | 11/2000 | Moertle et al. | |
| 6,240,732 B1 | 6/2001 | Allan | |
| 6,256,995 B1 * | 7/2001 | Sampath et al. | 60/740 |
| 6,351,948 B1 * | 3/2002 | Goeddeke | 60/740 |
| 6,357,222 B1 * | 3/2002 | Schilling et al. | 60/800 |
| 6,463,739 B1 | 10/2002 | Mueller et al. | |
| 6,523,350 B1 * | 2/2003 | Mancini et al. | 60/740 |
| 6,560,964 B2 * | 5/2003 | Steinhorsson et al. | 60/740 |
| 6,755,024 B1 * | 6/2004 | Mao et al. | 60/776 |
| 6,761,035 B1 * | 7/2004 | Mueller | 60/800 |
| 6,915,638 B2 * | 7/2005 | Runkle et al. | 60/740 |
| 7,028,484 B2 * | 4/2006 | Prociw et al. | 60/772 |
| 7,036,302 B2 * | 5/2006 | Myers Jr. et al. | 60/39.281 |
| 7,117,679 B2 * | 10/2006 | Toon et al. | 60/740 |
| 7,290,394 B2 * | 11/2007 | Lehtinen | 60/800 |
| 7,370,477 B2 * | 5/2008 | Roche et al. | 60/761 |
| 7,415,828 B2 * | 8/2008 | Brown | 60/798 |
| 2003/0014979 A1 | 1/2003 | Summerfield et al. | |
| 2007/0044477 A1 * | 3/2007 | Held et al. | 60/776 |
| 2009/0256003 A1 * | 10/2009 | McMasters et al. | 239/128 |

FOREIGN PATENT DOCUMENTS

CA    2307186    5/1999

* cited by examiner

FUEL MANIFOLD WITH REDUCED LOSSES

TECHNICAL FIELD

The invention relates generally to a fuel system of a gas turbine engine and, more particularly, to an improved fuel conveying member thereof.

BACKGROUND OF THE ART

Internal passageways that are used to convey fluids necessarily cause at least some pressure loss in the fluid flow. However, for certain applications, limiting this pressure loss is of vital importance. In gas turbine engines, improvement is constantly sought with respect to internal passage design such as to limit as much as possible unwanted pressure losses in the fluid, in order to therefore maximize efficiently as much as possible.

Figure 7:
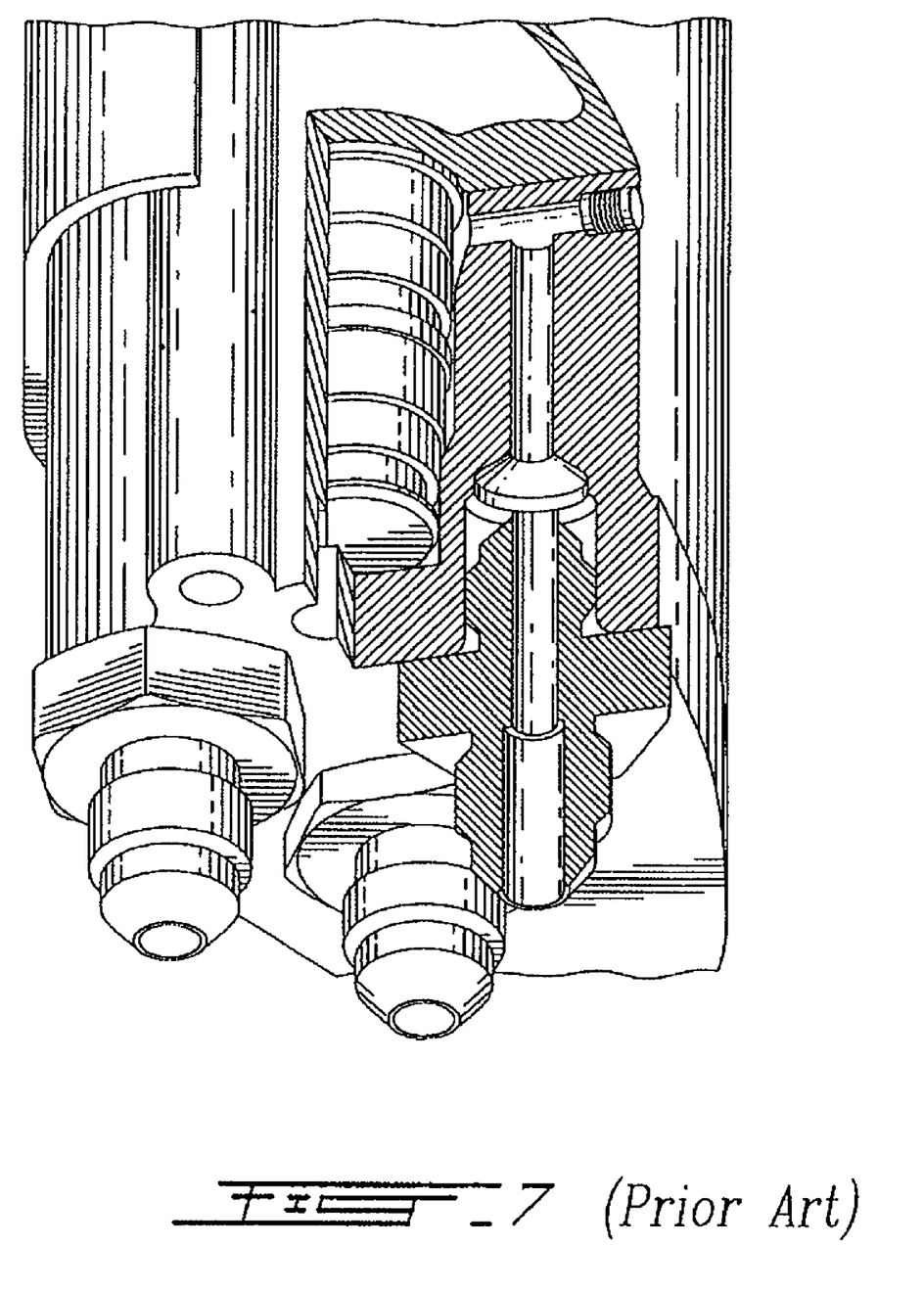
FIG. 7 is a partially sectioned perspective view of a fuel manifold of the prior art.

For complex fuel conveying members having multiple interconnected fluid passages, including bends, corners, steps, etc., such fluid dynamic losses can be even more exaggerated. For example, as shown in FIG. 7, in order to create an elbow or corner joint between two intersecting passageways within a common fuel system part, intersecting holes are typically cross-drilled and at least one of which is subsequently plugged in order to form the corner transition between the two drilled passages. However, this results in a very dramatic 90 degree angled corner which tends to cause excessive flow turbulence and high pressure losses in the fluid flow. Additionally, the use of plugged passageways requires pressure testing in order to ensure that no leaks exist about the plugs.

Accordingly, there is a need to provide a member of a gas turbine engine fuel system having an improved fuel conveying passage.

SUMMARY OF THE INVENTION

It is therefore an object of this invention to provide an improved fuel conveying member for a fuel system of a gas turbine engine.

In one aspect, the present invention provides a fuel conveying member of a gas turbine engine fuel system conducting pressurized fluid flow, the fuel conveying member comprising a body defining an L-shaped fuel flow passage internally extending at least partially therethrough, the fuel flow passage having first and second passage portions disposed transverse relative to each other and extending away from an elbow therebetween, the elbow linking and providing communication between the first and second passage portions, the first passage portion being in fluid-flow communication with an entrance of said body and having a first internal cross-sectional area and the second passage portion being in fluid-flow communication with an exit of said body and having a second internal cross-sectional area different from the first cross-sectional area, said elbow providing a first substantially smooth fluid-dynamic transition between said first and second passage portions.

In a second aspect, the present invention provides a method of providing an internal passage within a fuel conveying member of a gas turbine engine fuel system, the internal passage being for conveying pressurized fuel flow therethrough, the method comprising: forming a first passage portion within a solid portion said fuel conveying member; forming a second passage portion within said solid portion of said fuel conveying member, the second passage portion intersecting the first passage portion such as to form an elbow therebetween, the first and second passage portions defining said internal passage and providing said internal passage with a substantially L-shaped configuration; and creating an internal radius in a transition edge within said elbow, said transition edge being defined at an intersection of a portion of inner wall surfaces of said first and second internal passages, said radiused transition edge providing a substantially smooth fluid-dynamic transition between said first and second passage portions.

Further details of these and other aspects of the present invention will be apparent from the detailed description and figures included below.

BRIEF DESCRIPTION OF THE DRAWINGS

Reference is now made to the accompanying figures depicting aspects of the present invention, in which.

DETAILED DESCRIPTION OF A PARTICULAR EMBODIMENT

Figure 1:
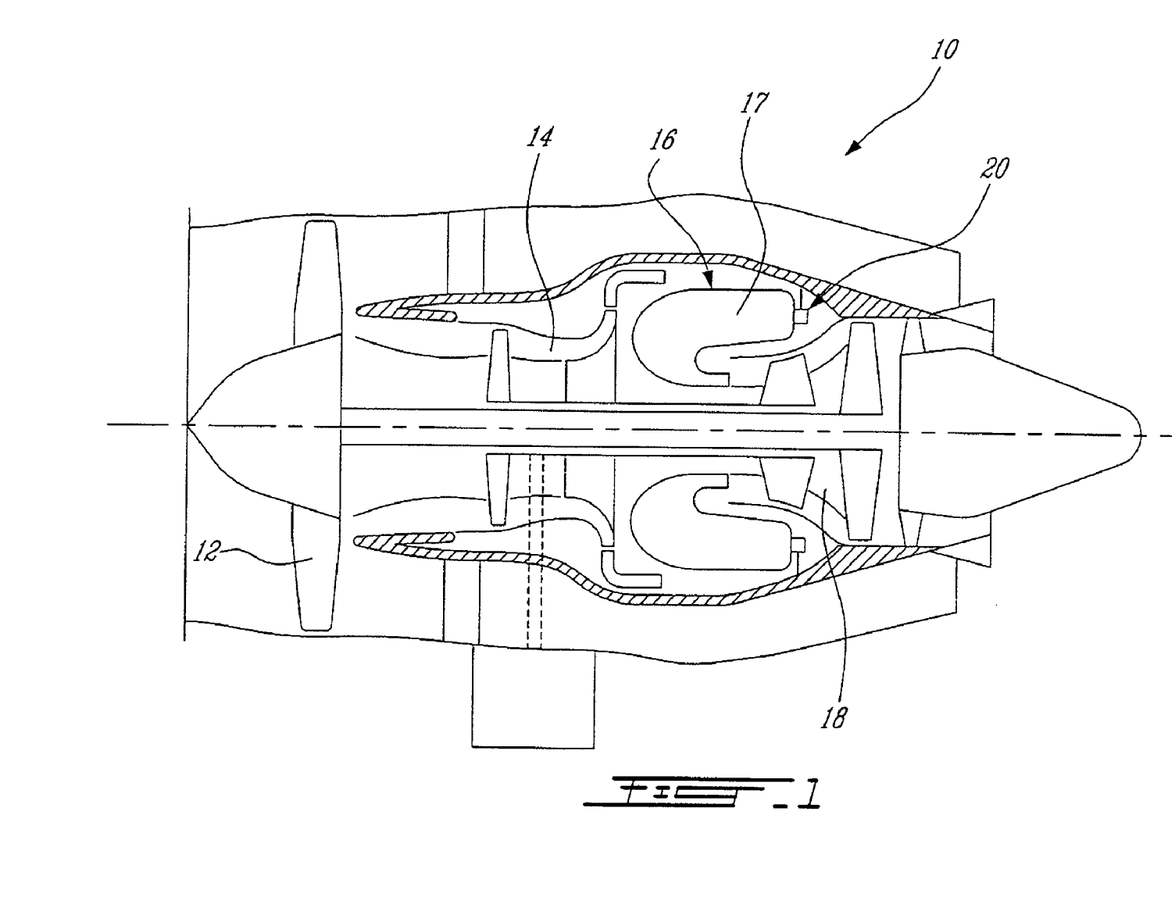
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel injected into the combustion chamber 17 by a fuel system 20, the mixture being subsequently ignited for generating a stream of hot combustion gases, and a turbine section 18 for extracting energy from the combustion gases.

Figure 2:
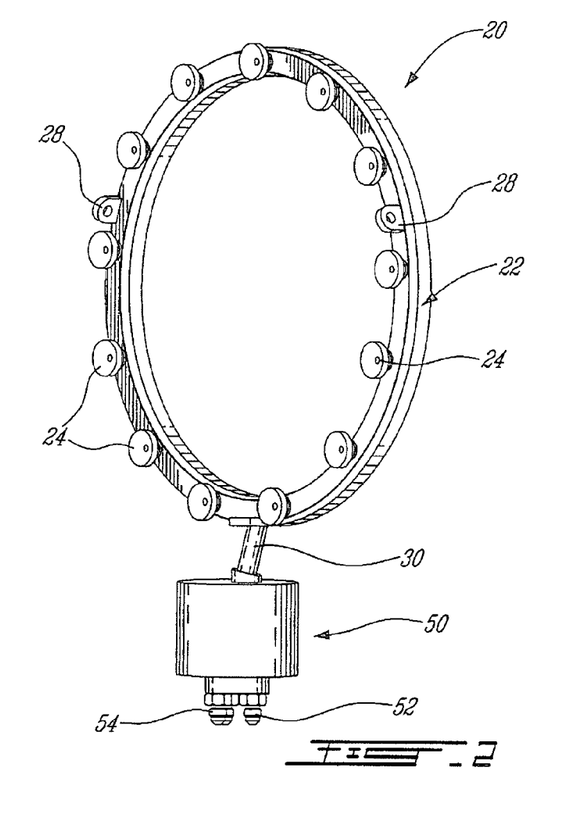
FIG. 2 is a perspective view of a portion of a fuel system of the gas turbine of FIG. 1, including an internal fuel manifold ring and an upstream fuel manifold.

Referring to FIG. 2, the fuel system 20 comprises an internal fuel manifold ring 22 generally disposed adjacent the combustion chamber 17 (see FIG. 1) of the engine, and mounted in place via several integral attachment lugs 28 for fixing the annular ring 22 to an appropriate support structure. The fuel manifold ring 22, or distribution fuel manifold, comprises a plurality of fuel injector spray tip assemblies 24 thereon, which atomize the fuel for combustion within the combustion chamber 17. The fuel manifold ring 22 therefore serves as a fuel distributing manifold, providing fuel flow communication between each of the fuel injector spray tip assemblies 24 and a fuel source (not shown) of the gas turbine engine 10. The fuel system 20 further includes an additional inlet fuel manifold 50, disposed downstream from the fuel source (such as a fuel tank) and upstream of the delivery fuel manifold ring 22. The additional, or inlet, fuel manifold assembly 50 therefore receives fuel flow from the fuel source and feeds the distributing fuel manifold ring 22 located downstream thereof. The inlet fuel manifold assembly 50 is connected to the fuel manifold ring 22 by the fuel inlet 30, which can include either one or more individual fuel inlet pipes. The fuel manifold assembly 50 may be mounted to a casing, such as a bypass duct assembly fairing for example, and thus may be called a "fuel fairing assembly". The fuel fairing manifold assembly 50 may of course be mounted to another suitable support structure member of the engine. The fuel manifold assembly 50 includes at least one inlet port 52, and may further include at least one additional port 54, which may be either an inlet or outlet for fuel or air flow. With two inlet ports, the fuel manifold 50 can provide the downstream distribution fuel manifold ring 22 with dual, independent dual fuel feeds.

Figure 3:
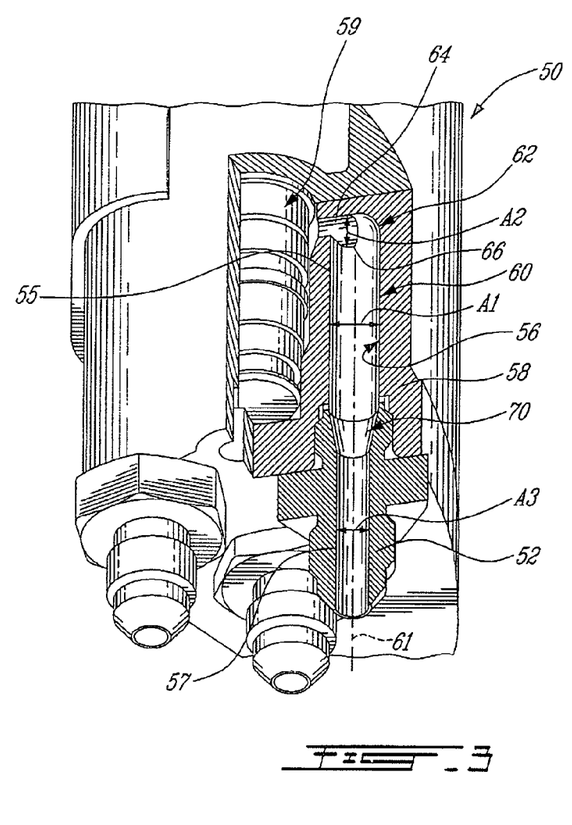
FIG. 3 is a partially sectioned perspective view of the fuel manifold of FIG. 2, in accordance with one aspect of the present invention.

Referring to FIG. 3, the inlet or fairing fuel manifold 50 includes a substantially L-shaped internal fuel flow passage 60 which is formed within the body 58 of the manifold. The fuel flow passage 60 includes at least a first passage portion 56 which extends through the inlet port 52 and into a body 58 of the manifold. A central fuel cavity 59 is defined within the fuel manifold 50, and collects incoming fuel within the fuel manifold 50 before being fed out through the passages of the fuel inlet 30 toward the internal manifold ring 22. As this collecting fuel cavity 59 is disposed substantially parallel to the first (inlet) fuel flow passage portion 56, fuel entering the fuel manifold 50 via the first passage portion 56 must necessarily turn a fairly sharp corner, or elbow, 62 (which in the embodiment depicted is approximately 90 degrees relative to a longitudinal axis 61 of the inlet passage portion 56), before flowing through the shorter second passage portion 64 of the fuel flow passage 60 and into the central collecting cavity 59. The relative angle between the first and second passage portions may be other than about 90 degrees, and can for example be anywhere between about 45 and 134 degrees. Fuel flowing into the fuel manifold 50, or out of the manifold in an alternate embodiment wherein fuel flows in the reverse direction through a similar flow passage, therefore flows through the substantially L-shaped internal fuel flow passage 60 which is formed within the body 58 of the manifold 50. The substantially L-shaped fuel flow passage 60 thus includes, in serial flow communication, the first passage portion 56, the elbow portion 62 and the second passage portion 64, all connected in fluid flow communication to link the inlet port 52 with the collecting cavity 59 of the fuel manifold 50. The first passage portion 56 and the second passage portion 64 may have different cross-sectional areas. The first passage portion defines an internal cross-sectional area A1, and the second passage portion 64 defines a second internal cross-sectional area A2. In the embodiment depicted in FIG. 3, the first internal cross-sectional area A1 is greater than the second internal cross-sectional area A2. In the case where either one or both of the first and second passage portions has a substantially circular cross-sectional area (i.e. defines a circular bore), then each will define internal diameters which may similarly differ from each other.

The elbow 62 of the L-shaped fuel flow passage 60 may be generated by the intersection of the first and second passage portions 56,64 formed within the body 58 of the manifold. The elbow 62 redirects the flow from the first passage portion 56 to the substantially perpendicularly arranged second passage portion 64. The elbow 62 provides a relatively smooth fluid-dynamic transition between the two intersecting passages 56,64 of the L-shaped fuel flow passage 60, which greatly reduces pressure losses and flow turbulence in comparison with the much more abrupt flow redirection of a T-junction configuration for example. This is especially beneficial when the downstream passage portion 64 has a different diameter than the passage portion 56 disposed on the upstream side of the elbow 62. The elbow 62 includes a radiused transition edge 66 therewith, the transition edge being defined at the intersection of the inner wall surfaces of the first passage portion 56 and the second passage portion 64. The radiused transition edge 66 further helps provide the relatively smooth fluid-dynamic transition within the angular elbow 62 located between the substantially rectilinear portions of the L-shaped fuel flow passage 60.

As seen in FIG. 3, the first passage portion 56 of the fuel flow passage 60 includes a downstream end 55, which has the first internal cross-sectional area A1, and an opposed upstream end 57 thereof. In the embodiment depicted in FIG. 3, the downstream end 55 of the first passage portion 56 is defined within the inlet port 52 of the fuel manifold 50, however this downstream end 55 may alternately be defined directly within the body 58 of the manifold. The downstream end 55 defines a third internal cross-sectional area A3 which is different from, and in one embodiment less than, the first internal cross-sectional area A1 of the downstream end 55 of the first passage portion 56. In the embodiment shown in FIG. 3, the second internal cross-sectional area A2 of the second passage portion 64 is smaller than the third internal cross-sectional area A3. The first passage portion 56 is formed such that a substantially smooth fluid-dynamic transition 70 is provided between the upstream and downstream ends 57, 55 thereof having different internal diameters. Accordingly, rather than there being a drastic step change in internal diameters between these two ends of the first passage portion 56, the transition region 70 between the two ends of the passage having different diameters gradually changes the cross-sectional flow area of the passage 56 thereby providing a fluid-dynamically smooth change in passage area and thus reduced pressure loss due to such a change in passage diameter.

Figure 4:
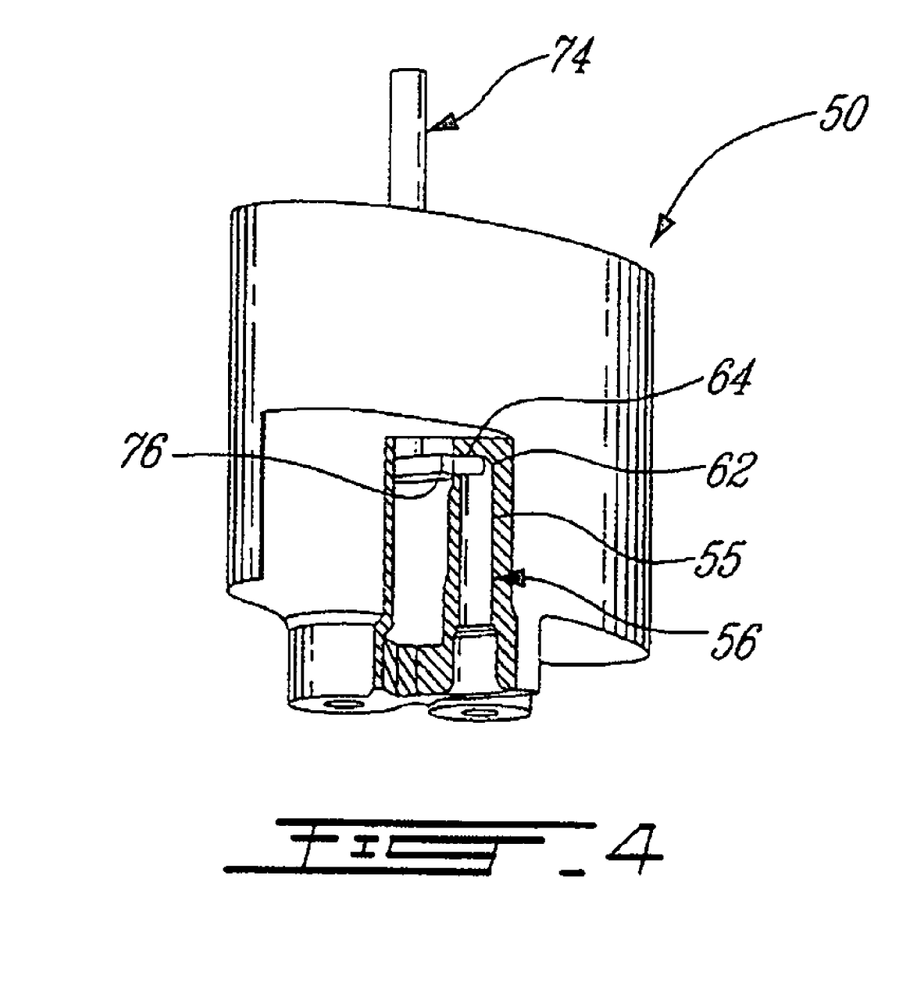
FIG. 4 is a partially sectioned perspective view of the fuel manifold of FIG. 3, shown with a machining tool used to create an internal fuel flow passage therein.

Although the internal L-shaped passage 60 of the fuel manifold 50 can be formed in a number of different ways, in one embodiment at least a portion of the L-shaped passage 60 is machined within the solid body 58 of the manifold by electrical discharge machining (EDM). Thus, either the entire L-shaped passage 60 is so formed by EDM, or alternately only one passage portion thereof is formed by EDM. The elbow 62 is preferably integrally formed with at least one of the two passage portions, whether by EDM or another machining operation. The internal elbow 62 is preferably formed by EDM, as machining this smooth internal passage corner within the body of the manifold would be more difficult using standard machining operations, due in part to the relatively inaccessible nature of this portion of the passage. As depicted in FIG. 4, an EDM tool 74 (such as an electrode) is shown inserted into the manifold (through a fairing bore in the top portion thereof) during the production manufacturing thereof, the machining tip 76 of the tool 74 being operable to reach the downstream end 55 of the first passage portion 56 in order to form at least the smoothly curved elbow 62 which provides a smooth fluid-dynamic transition between the upstream first passage portion 56 and the downstream second passage portion 64.

Figure 5:
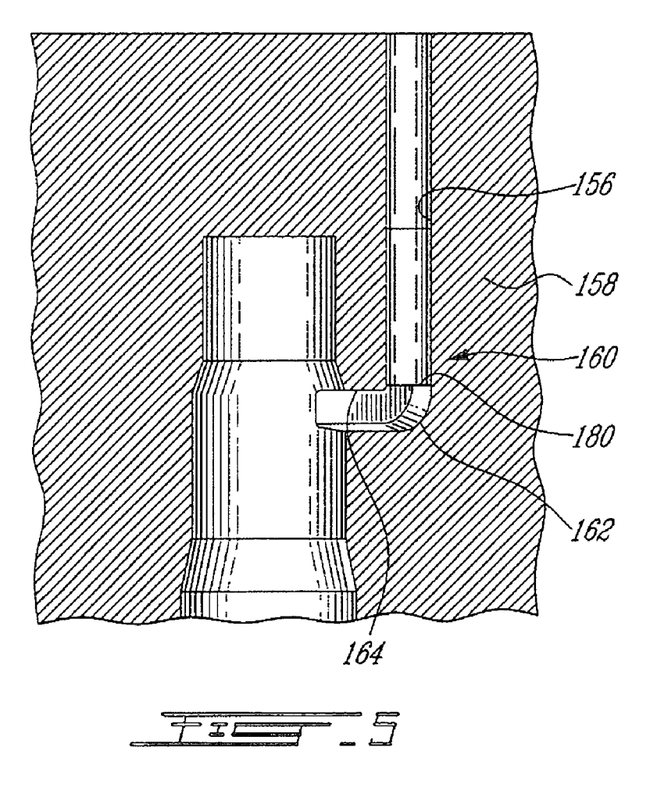
FIG. 5 is a schematic perspective view of an internal fuel flow passage formed in a fuel manifold in accordance with an alternate aspect of the present invention.
Figure 6:
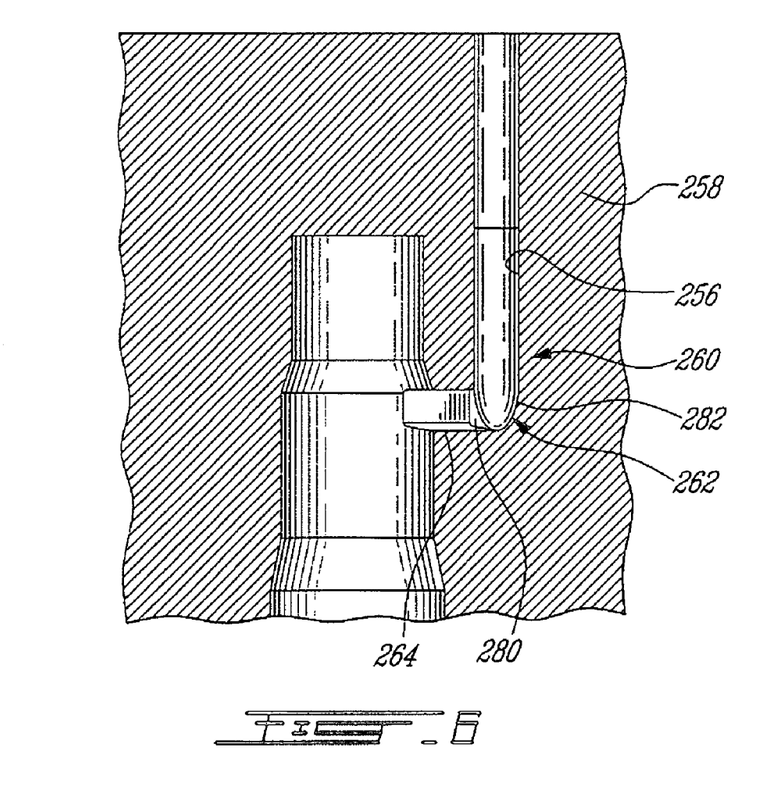
FIG. 6 is a schematic perspective view of an internal fuel flow passage formed in a fuel manifold in accordance with another alternate aspect of the present invention.

Referring to FIGS. 5 and 6, two alternate L-shaped passages within the body of the fuel manifold are shown, each being manufactured in a different manner. FIG. 5 depicts a first embodiment wherein the longer of the two passage portions of the L-shaped passage 160, namely the first passage portion 156, is machined within the solid body 158 of the manifold by a drilling or milling operation and therefore this first passage portion defines a substantially circular cross-sectional area (having an internal cross-sectional area A1). The shorter of the two passage portions of the L-shaped passage 160, namely the second passage portion 164, is formed within the body 158 by EDM. In this embodiment, the elbow portion 162 is integrally formed with the second passage portion 164 by the EDM process. Thus, the combined passage machined by EDM, namely the straight second passage portion 164 and the curved elbow portion 162 disposed at the end thereof, intersect the bore machined in the body of the manifold in order to create the first passage portion 156 of the fuel flow passage 160. The intersection of these two passages creates an internal radiused transition edge as described above with respect to FIG. 3, which helps to provide the smooth fluid-dynamic transition within the angular elbow 162 of the L-shaped passage 160. The second passage portion 164 (and therefore the elbow 162 integrally manufactured therewith) defines a substantially rectangular (or square) cross-sectional area, as opposed to the substantially circular cross-sectional area of the first passage portion 156. Thus, the intersection plane 180 between the two passage portions is, in this embodiment, substantially parallel to the second passage portion 164, and the radiused transition edge within the elbow portion 162 is located on an inner edge of this intersection plane 180. As the portion of the L-shaped passage 160 formed by EDM includes the curved elbow 162, the radiused transition edge within the elbow portion 162 is thus preferably formed in this embodiment by EDM.

In FIG. 6, the L-shaped fuel flow passage 260 is also formed within the body 258 of the fuel manifold by a combination of traditional machining (i.e. drilling, milling, etc.) and EDM. The L-shaped passage 260 includes a first passage portion 256 which is formed within the body 258 by a traditional machining process such as drilling, and defines a substantially circular cross-sectional area. A shorter second passage portion 264 is formed within the body 258 by EDM. The second passage portion 264 defines a substantially rectangular or square cross-sectional area. In this embodiment, however, the corner portion 262 of the L-shaped passage 260 is not formed integrally with the EDMed second passage portion 264. The bore used to form the first passage portion 256 is provided with a semi-spherical rounded end 282. The second passage portion 264 formed by EDM intersects this end 282 of the first passage portion 256, defining an intersection plane 280 which is substantially parallel to the first passage portion 256. The radiused transition edge within the elbow 262 is thus formed within this intersection plane 280 on the bore of the end 282 of the first passage portion 256.

Regardless of which manufacturing embodiment is chosen, the L-shaped passage 60,160,260 enables a substantially smooth fluid-dynamic transition at the corner elbow 62,162, 262 thereof, such that reduced pressure losses and reduce flow turbulence occur. Any change in passage cross-sectional area is also provided with a smooth transition shape, such that the entire L-shaped passage within the fuel manifolds of the present invention improve fuel flow efficiency within such an internal fuel flow passage. Furthermore, the elbow is contiguous, and therefore leakproof relative to a design such as that shown in FIG. 7, reduces part count (no plug), and does not need to be pressure-tested.

When manufacturing the L-shaped passage within the solid body of the fuel manifold, the first and second passage portions are formed, either in succession or simultaneously if the manufacturing environment and equipment allows such simultaneously multiple-machining processing, such that they intersect to form an elbow therebetween, the elbow providing a substantially smooth angular redirection of fluid flow within the L-shaped passage. The step of intersecting the two passages during their forming includes creating an internal radius in a edge within the elbow of the passage, the transition edge being defined within an intersection plane at the intersection of inner wall surfaces of the first and second passage portions. The radiused transition edge helps to provide a substantially smooth fluid-dynamic transition between the first and second passage portions, which may be oriented at about 90 degrees relative to each other within the body of the fuel manifold. Either one or both of the first and second passage portions of the L-shaped passage can be formed within the body of the manifold by EDM, and the elbow portion of the L-shaped passage can be also formed by EDM, whether in a separate operation or simultaneously with the formation of one of the two passage portions with which it may be integrally formed. The first and second passage portions may also be formed, whether by EDM or traditional machining such as drilling for example, having different cross-sectional areas. In one embodiment, the second passage portion is formed having a cross-sectional area which is less than that of the first passage portion. The elbow therebetween, including the radiused transition edge therein, therefore provides a substantially smooth fluid-dynamic transition between the first and second passage portions which are both angularly oriented relative to each other and have different cross-sectional areas. The first passage portion may also be formed having first and send ends thereof, each having a different cross-sectional area. In this case, the method of forming such a first passage portion further includes forming a substantially smooth fluid-dynamic transition between these opposed and differently sized ends of the first passage portion. This may be done by EDM, or an alternate machining method.

The above description is meant to be exemplary only, and one skilled in the art will recognize that changes may be made to the embodiments described without department from the scope of the invention disclosed. For example, the although the fluid flow passage 60 is described as an L-shaped passage, it is to be understood that the internal fluid flow passage formed within the body of the fuel manifold may have another different passage shape, providing it includes first and second substantially rectilinear passage portions which intersect each other and are oriented at an angle relative to each other, and having an arcuate elbow portion disposed therebetween which provides a substantially smooth fluid-dynamic transition between the two passage portions. The fluid flow passage, although described as being for directing pressurized fuel flow, may of course also be used for conducting another fluid within the body of a fluid conveying member of a gas turbine engine fuel system, whether the fuel conveying member is a fuel manifold or other fuel conveying member of the fuel system. Either the whole, or any part of, the fluid flow passage 60,160,260 may be manufactured by EDM, and having either a constant cross-sectional area, or with portions thereof having a different cross-sectional area than other portions. Still other modifications which fall within the scope of the present invention will be apparent to those skilled in the art, in light of a review of this disclosure, and such modifications are intended to fall within the appended claims.

The invention claimed is:

1. A fuel conveying member of a gas turbine engine fuel system conducting pressurized fluid flow, the fuel conveying member comprising a one-piece body defining an L-shaped fuel flow passage internally extending at least partially therethrough, the fuel flow passage having first and second passage portions disposed transverse relative to each other and extending away from an elbow therebetween, the elbow linking and providing communication between the first and second passage portions, the elbow including a transition edge defined at an intersection of inner wall surfaces of said first and second passage portions, said transition edge being radiused, the first passage portion being in fluid-flow communication with an entrance of said body and having a first internal cross-sectional area and the second passage portion being in fluid-flow communication with an exit of said body and having a second internal cross-sectional area, the second internal cross-sectional area having a size different from that of the first internal cross-sectional area, the first internal cross-sectional area being substantially circular and the second internal cross-sectional area being substantially rectangular, and said elbow providing a first substantially smooth fluid-dynamic transition between said first and second passage portions.

2. The fuel conveying member as defined in claim 1, wherein said fuel conveying member is a fuel manifold of said gas turbine engine fuel system.

3. The fuel conveying member as defined in claim 1, wherein said first internal cross-sectional area is greater than said second internal cross-sectional area.

4. The fuel conveying member as defined in claim 1, wherein said elbow is formed by the intersection of said first and second passage portions.

5. The fuel conveying member as defined in claim 1, wherein said first passage portion includes a downstream end, having said first internal cross-sectional area and being adjacent said elbow, and an upstream end thereof, said upstream end of said first passage portion having a third internal cross-sectional area different than said first internal cross-sectional area.

6. The fuel conveying member as defined in claim 5, wherein said first passage portion includes a second substantially smooth fluid-dynamic transition between said upstream and downstream ends thereof.

7. The fuel conveying member as defined in claim 5, wherein said third internal cross-sectional area is smaller than said first internal cross-sectional area.

8. The fuel conveying member as defined in claim 7, wherein said second internal cross-sectional area is smaller than said third internal cross-sectional area.

9. The fuel conveying member as defined in claim 1, wherein at least one of said first passage portion and said second passage portion is an EDM-formed passageway.

10. A method of providing an internal passage within a fuel conveying member of a gas turbine engine fuel system, the internal passage being for conveying pressurized fuel flow therethrough, the method comprising:
  forming a first passage portion within a solid portion of said fuel conveying member, said first passage portion having a first internal cross-sectional area that is substantially circular in shape;
  forming a second passage portion within said solid portion of said fuel conveying member, the second passage portion intersecting the first passage portion such as to form an elbow therebetween, the first and second passage portions defining said internal passage and providing said internal passage with a substantially L-shaped configuration, said second passage portion having a second internal cross-sectional area that is substantially rectangular in shape, the second internal cross-sectional area having a size that is different from that of the first internal cross-sectional area; and
  creating an internal radius in a transition edge within said elbow, said transition edge being defined at an intersection of a portion of inner wall surfaces of said first and second internal passages, said radiused transition edge providing a substantially smooth fluid-dynamic transition between said first and second passage portions.

11. The method as defined in claim 10, further comprising forming at least one of said first and second passage portions by electric discharge machining.

12. The method as defined in claim 10, wherein the step of creating an internal radius is performed by electric discharge machining.

13. The method as defined in claim 10, wherein the step of creating an internal radius is performed simultaneously with the step of forming the second passage portion, the intersection of the second passage portion and the first passage portion creating said radiused transition edge.

14. The method as defined in claim 10, further comprising forming said first passage portion having a first end adjacent said elbow and a second end opposite said first end, the first and second ends of said first passage portion having different internal cross-sectional area.

15. The method as defined in claim 14, further comprising forming a substantially smooth fluid-dynamic transition in said first passage portion between said first and second ends thereof.

16. The method as defined in claim 15, wherein the step of forming said substantially smooth fluid-dynamic transition is performed by electric discharge machining.

17. A method of providing an internal passage within a fuel conveying member of a gas turbine engine fuel system, the internal passage being for conveying pressurized fuel flow therethrough, the method comprising:
  forming a first passage portion within a solid portion of said fuel conveying member using electric discharge machining, said first passage portion having a first internal cross-sectional area;
  forming a second passage portion within said solid portion of said fuel conveying member using electric discharge machining, the second passage portion intersecting the first passage portion such as to form an elbow therebetween, the first and second passage portions defining said internal passage and providing said internal passage with a substantially L-shaped configuration, said second passage portion having a second internal cross-sectional area, the second internal cross-sectional area having a size that is different from that of the first internal cross-sectional area; and
  creating an internal radius in a transition edge within said elbow using electric discharge machining, said transition edge being defined at an intersection of a portion of inner wall surfaces of said first and second internal passages, said radiused transition edge providing a substantially smooth fluid-dynamic transition between said first and second passage portions.

18. The method as defined in claim 17, further comprising forming said first passage portion such that said first internal cross-sectional area is substantially circular in shape and forming said second passage portion such that said second internal cross-sectional area is substantially rectangular in shape.

19. The method as defined in claim 17, further comprising forming said first passage portion with a downstream end having said first internal cross-sectional area and being adjacent said elbow, and an upstream end opposite said downstream end, and forming the upstream end of said first passage portion having a third internal cross-sectional area different than said first internal cross-sectional area.

20. The method as defined in claim 19, further comprising forming a second substantially smooth fluid-dynamic transition in said first passage portion between said upstream and downstream ends thereof.

* * * * *